US009909708B1

(12) United States Patent
Penland, Jr. et al.

(10) Patent No.: US 9,909,708 B1
(45) Date of Patent: Mar. 6, 2018

(54) PREVENTING DISTURBANCES OF UNDERGROUND CONDUIT

(71) Applicant: QUALITY MAT COMPANY, Beaumont, TX (US)

(72) Inventors: Joe Penland, Jr., Beaumont, TX (US); Scott Calvert, Beaumont, TX (US); Thomas O'Brien, Wanaka (NZ)

(73) Assignee: Quality Mat Company, Beaumont, TX (US)

( * ) Notice: Subject to any disclaimer, the term of this patent is extended or adjusted under 35 U.S.C. 154(b) by 0 days.

(21) Appl. No.: 15/365,265

(22) Filed: Nov. 30, 2016

(51) Int. Cl.
F16L 57/00 (2006.01)
E02D 17/10 (2006.01)

(52) U.S. Cl.
CPC .............. F16L 57/00 (2013.01); E02D 17/10 (2013.01)

(58) Field of Classification Search
CPC .. F16L 57/00; F16L 1/11; E02D 31/02; E02D 17/10
USPC ..... 405/157, 38, 39, 43, 133, 134, 135, 151; 138/104, 105, 106; 52/578, 581, 589.1, 52/590.2, 592.1, 592.4, 592.5, 592.6
See application file for complete search history.

(56) References Cited

U.S. PATENT DOCUMENTS

| 3,282,057 | A | * | 11/1966 | Prosser | F16L 1/11 116/DIG. 14 |
| 4,462,712 | A | * | 7/1984 | Penland, Sr. | E01C 9/086 404/36 |
| 5,250,340 | A | * | 10/1993 | Bohnhoff | E01C 9/004 404/36 |
| 5,822,944 | A | * | 10/1998 | Penland, Sr. | E04B 5/14 404/35 |
| 6,722,814 | B2 | * | 4/2004 | Byrne | E01C 23/06 404/35 |
| 7,290,958 | B2 | * | 11/2007 | Blackwood | E02B 11/00 405/43 |
| 8,266,849 | B2 | * | 9/2012 | Bravo | E04F 15/043 52/177 |
| 8,382,393 | B1 | * | 2/2013 | Phillips | E01C 9/086 404/34 |
| 9,303,366 | B2 | * | 4/2016 | Downing | E01C 9/086 |
| 2003/0230494 | A1 | * | 12/2003 | Costa | C23F 13/04 205/724 |
| 2007/0094979 | A1 | * | 5/2007 | Richardson | E04L 31/34321 52/578 |

(Continued)

Primary Examiner — Carib A Oquendo
(74) Attorney, Agent, or Firm — Winston & Strawn LLP

(57) ABSTRACT

A protective mat for covering buried conduit in the form of a rectangular structure comprising upper and lower sections wherein the upper section includes elongated members, a sheet structure that includes a plurality of downward facing open cells, or an open grid or grating and wherein the lower section includes elongated members, a sheet structure that includes a plurality of upward facing cells, or an open grid or grating; a forward end that includes one or more protruding elements; and a rearward end that includes one or more recesses that are configured and dimension for receiving the protruding element(s) of a similarly configured adjacent mat. Thus, the protruding element(s) and recess(es) are associated with and located on the lower section of the mat such that the protruding element(s) of one mat can be inserted in the recess(es) of and adjacent mat to interlock the mats together.

19 Claims, 16 Drawing Sheets

(56) References Cited

U.S. PATENT DOCUMENTS

| | | | |
|---|---|---|---|
| 2009/0031658 A1* | 2/2009 | Moller, Jr. | E01C 5/20 52/403.1 |
| 2012/0224923 A1 | 9/2012 | Joubeaux | |
| 2014/0183319 A1* | 7/2014 | Tubbs | B32B 7/08 248/346.02 |

* cited by examiner

PREVENTING DISTURBANCES OF UNDERGROUND CONDUIT

BACKGROUND

The present invention concerns a system and method for covering and protecting buried pipes or cables from inadvertent disturbance or damage due do nearby excavation or other ground site rearrangement.

To prevent buried pipes or cables from being damaged or disturbed during earthwork operations, it is known to use covering and protecting devices embedded in the earth and arranged above buried pipes or cables. In particular, US patent application publication 2012/0224923 discloses a device that includes a substantially planar plate made of a single piece of synthetic material and having complementary assembly means at the front and back edges which are arranged so as to enable the assembly of two adjacent plates. The complementary assembly means is designed to enable two adjacent plates to be hinged about an axis substantially perpendicular to the plane of the adjacent plates. Also, the plate comprises a plurality of through-openings.

These covering devices firstly allow the protection of the buried pipes or cables against deteriorations caused by the scoop of a mechanical digger, and secondly they warn operators of the presence of pipes or cables so that the digger does not dig deeper into the soil where it can contact or damage the buried pipes or cables.

There still remains a need for improved devices to facilitate installation and protection of such buried pipes or cables, and this need is now addressed by the present invention.

SUMMARY OF THE INVENTION

The invention now provides a protective mat for covering buried conduit in the form of a rectangular structure comprising upper and lower sections wherein the upper section includes elongated members, a sheet structure that includes a plurality of downward facing open cells, or an open grid or grating and wherein the lower section includes elongated members, a sheet structure that includes a plurality of upward facing cells, or an open grid or grating; a forward end that includes one or more protruding elements; and a rearward end that includes one or more recesses that are configured and dimension for receiving the protruding element(s) of a similarly configured adjacent mat. Thus, the protruding element(s) and recess(es) are associated with and located on the lower section of the mat such that the protruding element(s) of one mat can be inserted in the recess(es) of and adjacent mat to interlock the mats together.

In one embodiment, the upper section of the rectangular structure includes a first grid or grating of fiberglass reinforced plastic having openings of sufficient dimensions to reduce the weight of the structure; and the lower section of the rectangular structure includes additional grid components, one of which forms the protruding element and two others of which form the recess for receiving the protruding element of an adjacent mat. Alternatively, the lower section of the rectangular structure can instead include a plurality of elongated members, at least three of which form the protruding elements and others which define the recesses for the protruding elements of an adjacent mat.

In another embodiment, the upper section of the rectangular structure includes a plurality of elongated members and the lower section of the rectangular structure includes at least three grid or grating components, one of which forms the protruding element and the two others of which form the recess for receiving the protruding element of an adjacent mat. Typically, the elongated members of the upper section are high density polyethylene boards, fiberglass reinforced plastic pultrusions, or solid or hollow wood members.

In yet another embodiment, the rectangular structure is made of plastic material, with the upper section of the rectangular structure including a plurality of downward facing open cells, and with the lower section including a sheet structure that includes a plurality of upward facing cells. The open cells of the upper and lower sections each may have polygonal, round or oval shapes and are aligned in rows or columns and the upper and lower sections are part of an integral plastic layer. Some of the cells are preferable open to allow liquid, moisture or gas to pass through the protective mat.

In yet another embodiment, the mats of the invention can be made of elongated members of lightweight wood, plastic material, a foamed material, or a tubular material of wood, plastic or metal. These members can be provided in a two layer mat wherein the upper section includes a first arrangement of elongated members and the lower section includes a second arrangement of elongated members oriented at an angle with respect to the arrangement of elongated members in the upper section. The angle can vary from 10 to 170 degrees but preferably is 90 degrees. Also, if desired, a third layer of elongated members may be provided between the upper and lower sections, and in that situation, the upper and lower sections would be oriented in the same direction with the arrangement of elongated members in the third layer being oriented at an angle. For the mats of elongated members, the protruding elements would typically be 1, 2, 3 or 4 elongated members arranged to extend past the forward end of the mat. When those elongated members are of the same length as the other members in the mat, their positioning also creates the recesses that can receive the protruding elements of a similarly configured mat.

Preferably, at least the upper section is preferably made of a bright color, such as yellow or orange. This can be added after the upper section is formed or it can be included in the materials that are used to form the upper section of the protective mat.

The invention also relates to a system for protecting underground conduit, which comprises a plurality of rectangular protective mats according to the invention with adjacent mats interlocked by the protruding element(s) of one mat received in the recess(es) of an adjacent mat. The system advantageously includes one or more protective mats that have a triangular, trapezoidal or square shape with protruding element(s) and recess(es) that are not aligned so that the interlocked mats can be provided in other than a linear arrangement. This allows the installed mats to follow the direction of the buried conduit.

Yet another embodiment of the invention is a method for protecting a buried conduit, which comprises positioning and interlocking the mats of the system described herein above a conduit that is provided in a trench that is backfilled to form a generally horizontal surface; and placing additional backfill in the trench upon and above the interlocked mats to fill the trench to ground level. Preferably, the mats have openings therein to allow liquid, moisture, or gas to pass therethrough. Also, at least some of the mats are configured to provide a change in direction when interlocked with a previously installed adjacent mat. Finally, the upper section of the mats preferably includes writing or indicia thereon that indicates that type of conduit that is buried beneath the interlocked mats.

BRIEF DESCRIPTION OF THE DRAWINGS

Preferred features of the invention will now be described with respect to the appended drawing figures, wherein.

DETAILED DESCRIPTION OF THE INVENTION

Figure 1:
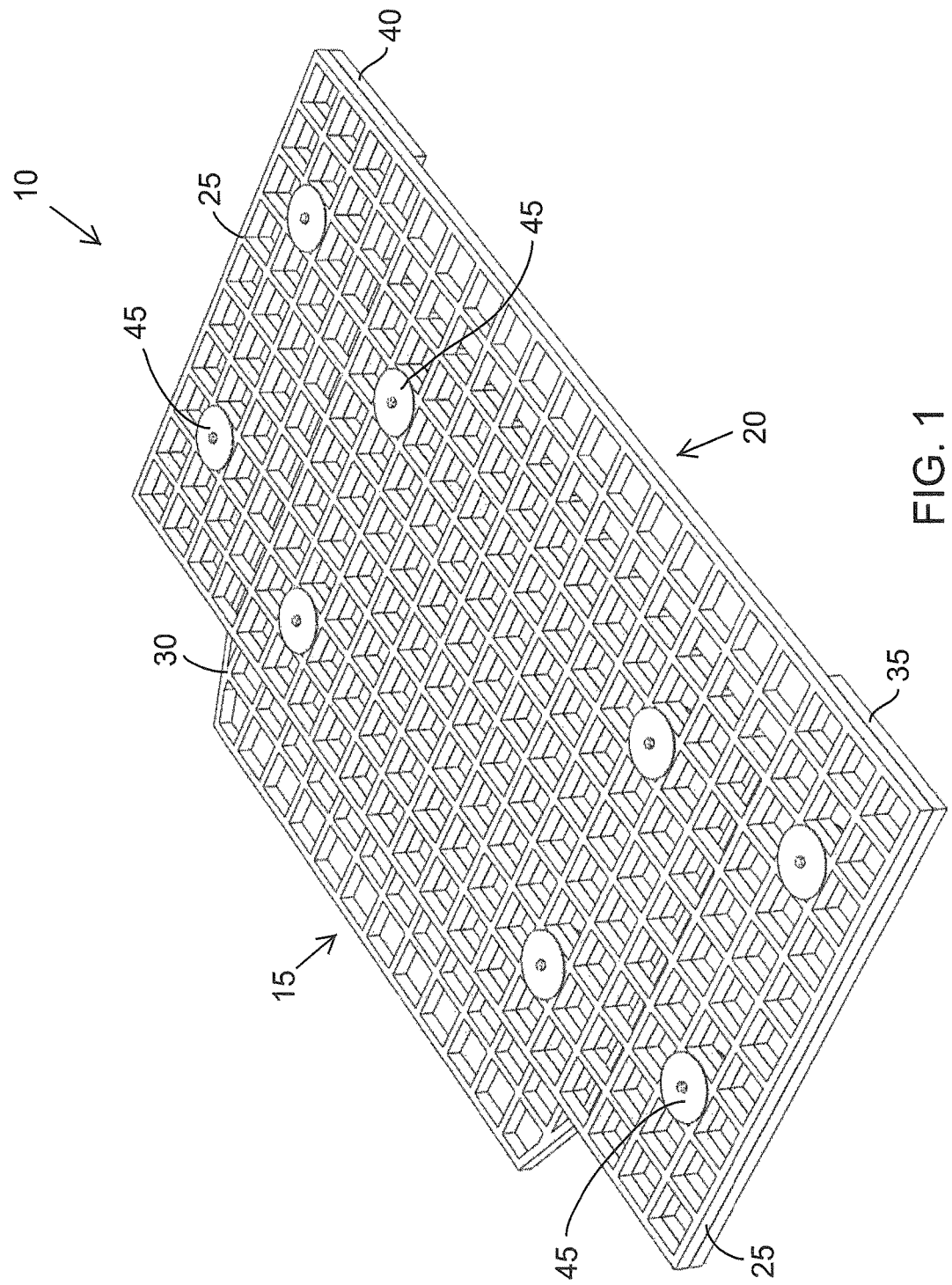
FIG. 1 is a top view of a fiberglass reinforced plastic grating for use in protecting buried conduit according to the present invention.

The term "mat" as used herein is intended to cover mats having widths of at least about 3 to 8 feet and preferably about 4 to 6 feet with shorter lengths running from about 2 to 6 feet and preferably about 3 to 4 feet. When the mat incorporates elongated members, beams, or other components having square or rectangular cross sections, the sizes of those members are about between about ¼ and 1 inch in thickness, and preferably about ½ to 1 inch, with a width dimension of about 2 to 5 inches and preferably about 3 to 4 inches with lengths running about the same length as the length or width of the mat depending upon how the elongated members are arranged. The sizes of the protective mats can range from 2×2 feet to 8×14 feet although it is anticipated that most will have a size of 3×3 feet to 3×7 feet. The larger mats will need to be installed by heave equipment, but the smaller mats are designed to be installed manually either underground or in light duty areas, for example, a base for temporary or special events. For those uses, however, the upper surface of the mats would be provided with a slip resistant surface, such as by adding grit or exposed surface particles, as well as by including additives for flammability and/or to diffuse static charge in particular when the mats are made of a plastic material. Additionally, these additives may be provided as a coating. As these are generally known in the art no further description is needed herein. Also, the fact that the protective mats of the invention can be interlocked without pinning is a particular advantage that facilitates installation. Preferred dimensions of the various material mats are described throughout the specification. As noted, previous and current mats of this type that are commercially available are primarily constructed of monolithic wood.

The term "substantially" is used for its ordinary meaning to indicate that the dimensions are not precise or exact. A skilled artisan can readily determine what tolerances are acceptable to provide a surface that is considered to be uniform based upon the size of the mat or the members that are used to construct it. There is no requirement that the mat components be flush with each other along the top and bottom surfaces of the mat. Typically, the term "substantially" will mean that the top surfaces of the mat components can vary by as much as a few inches although in the more preferred embodiments the variance is less than 1 inch.

Additionally, all dimensions recited herein are approximate and can vary by as much as ±10% to in some case ±25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

The invention provides a system of interlocked protective mats that cover buried conduit wherein the mats are simple, economic and lightweight structures that facilitate installation by personnel without the use of heavy equipment.

Generally, the installation includes the steps of first preparing the conduit installation by digging a trench in the ground using a mechanical earthwork device; arranging the conduit in a lower portion of the trench; backfilling the lower portion of the trench to cover the pipe, preferably with a layer of earth, and providing a relatively horizontal surface above the pipe and within the trench; positioning and interlocking a plurality of mats according to the invention on the horizontal surface above the conduit; and placing additional backfill in the trench upon and above the interlocked mats to fill the trench to ground level.

The presence of grating openings allows groundwater to pass through the cover plate which avoids the buildup of saturated ground above the protective cover. This also reduces the risks of soil creep. In addition, the presence of the openings facilitates the passing of electric or electromagnetic signals emitted by a detection and identification device, and hence improves the locating of buried pipes and/or cables. Furthermore, when protective cover is installed above gas pipes, the presence of the openings allows gas to pass through the grating in the event of a leak. The material used for the protective cover and the overall size are selected to provide a structure that is lightweight and easy to handle. In particular, the weight of these structures will be less than 200 pounds, typically between about 60 and 150 pounds and preferably between 65 and 100 pounds.

A safety feature of the mats of the invention includes providing at least the upper section of the mat with a bright color that provides a visual warning for an operator during earthwork operations. Additionally or alternatively, appropriate wording can be provided on the upper surface of the upper section, so that an identification of the subjacent conduit can be provided. The particular types of buried conduit generally includes pipes or cables, such as fluid transport pipes or electric lines, fiberoptic elements, or telecommunication cables, alone or provided in suitable tubing or piping to prevent ground moisture from contaminating the lines or cables.

In order to allow interlocking of the cover mats of the invention, the forward end of the mats includes one or more projections. The mats are also configured with one or more correspondingly sized recesses on the rearward end to receive the one or more projections and allow adjacent mats to be interlocked in the desired position during installation. Preferably, most of the mats are substantially rectangular to follow along the length and direction of the buried conduit. As the conduit will typically change direction to move around obstacles or to be placed in more convenient locations when installed, the protective mats also need to be able to change direction to follow the contour of the installed conduit. For this, a rectangular mat can be used that has projections and recesses on adjacent rather than opposite sides. This allows the mat to provide a 90° turn similar to an elbow joint in a pipe. The projections can easily be made in the same way as disclosed herein, but the recesses to receive the projections of an adjacent mat would be up provided on an adjacent side of the mat. A skilled artisan can easily design the appropriate configurations of this structure based on the disclosure of the rectangular mats that are described in detail herein.

Another way that the mats can be installed to change direction is that they can be configured with the projections and recesses formed at an angle within the rectangular mat. This would allow the angled projections/recesses to turn by an angle of anywhere from 5 to 45°. Of course, additional or greater angles can be provided but in some respects it is easier to provide multiple mats of smaller angles to achieve the same change of direction result.

Yet another way to allow the mat installation to change direction would be to use different shaped mats, such as triangular, hexagonal, trapezoidal, rhombohedral, or variations thereof. Of course, mats can be cut in the field to the precise shape to allow such changes of direction and then simply be bolted or otherwise joined together to form a continuous protective cover over the buried conduit.

In the designs described herein, the projections can have beveled edges or recesses that are designed to be larger than the forward portions so that it is easy to insert them into the corresponding recesses. In a preferred embodiment, a taper is provided wherein the forwardmost edge of the projection is less wide then the rearward end of the projection that contacts and extends from the lower section of the mat while the recess is slightly larger and tapered or not.

The protective mats of the invention are generally made in two sections although in some constructions the two sections comprise upper and lower portions of a unitary mat. A wide variety of combinations of such sections is contemplated by the invention. Preferred examples include upper and lower sections can each be made of an elongated members of wood or a thermoplastic material such as high density polyethylene (HDPE) that are 2 to 4 inches wide and ¼ or ½ to 1 inch thick. Alternatively, one of the sections can comprise the wood or HDPE boards, while the other section comprises a 2 inch thick fiberglass reinforced polyester or epoxy grating, or a 2 inch thick thermoplastic mat with geometry designed add some structure while lessening the overall weight of the mat. And when the two sections comprise upper and lower portions of a unitary mat, the mat thickness can be from about 1 to 3 inches although a thickness of 2 inches or even one inch can suffice. The thinner thicknesses provide a lightweight mat of about 60 to 65 pounds for the sizes disclosed herein and can be moved or installed by a single worker. Of course, with two workers the installation is much easier and the mats can be heavier.

These mats can be installed with the upper section facing downward or with the lower section facing downward. The specific material selection and mat design (size and configuration) can be selected for a particular installation above buried conduit.

Another advantage of the present invention is that the protective mats installed underground can also help with loads traveling on the above ground area to help with some of the downward pressure from vehicle travel or loads placed on the ground about the protective mats. This is not a complete substitute to conventional mats that are used above ground for such purposes but the protective mats do contribute to ground stabilization beneath the conventional mats. Also, in some light duty applications, the protective mats of the invention may be placed above ground.

Figure 2:
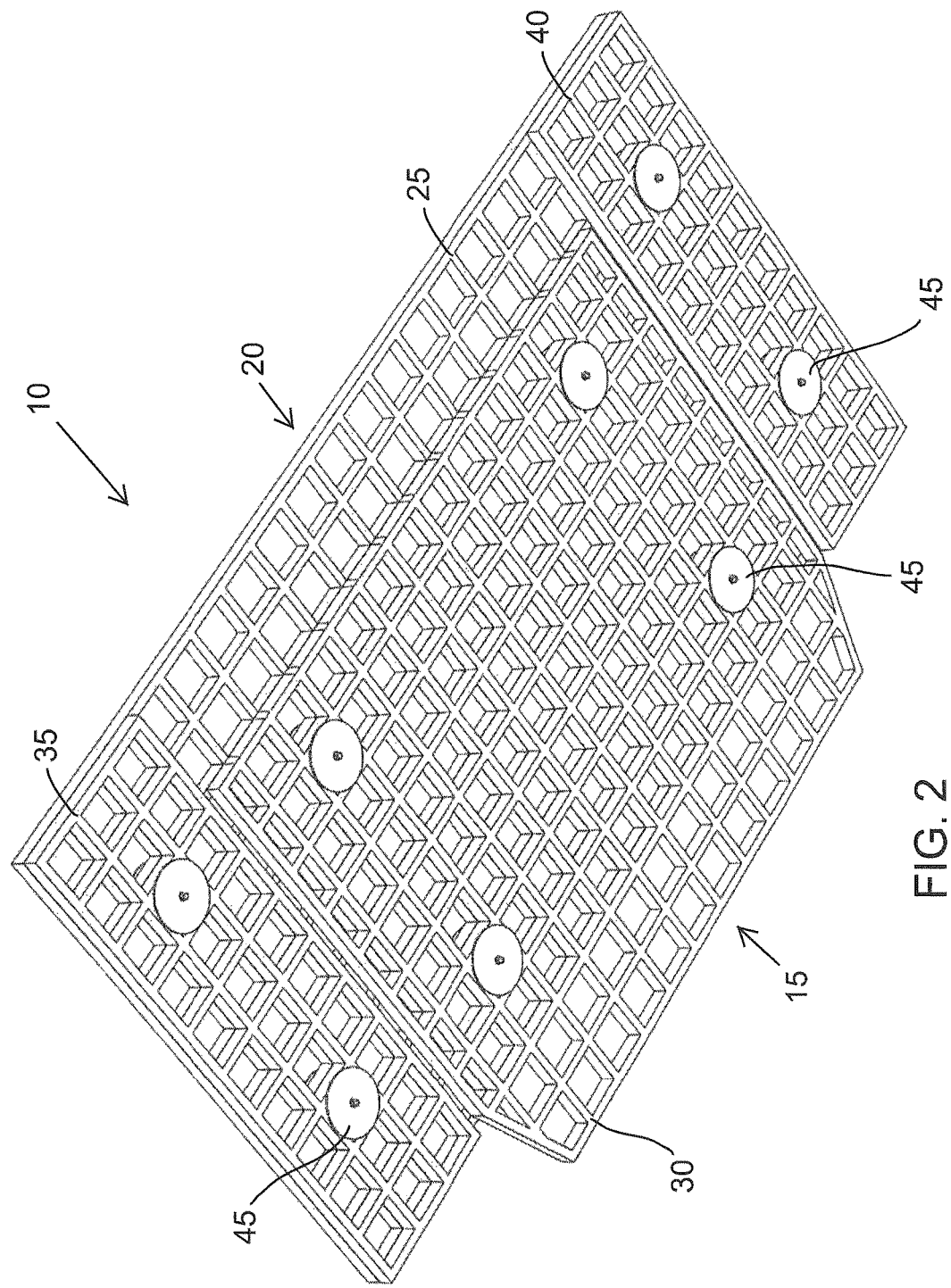
FIG. 2 is a bottom view of the fiberglass reinforced plastic grating of FIG. 1.
Figure 3:
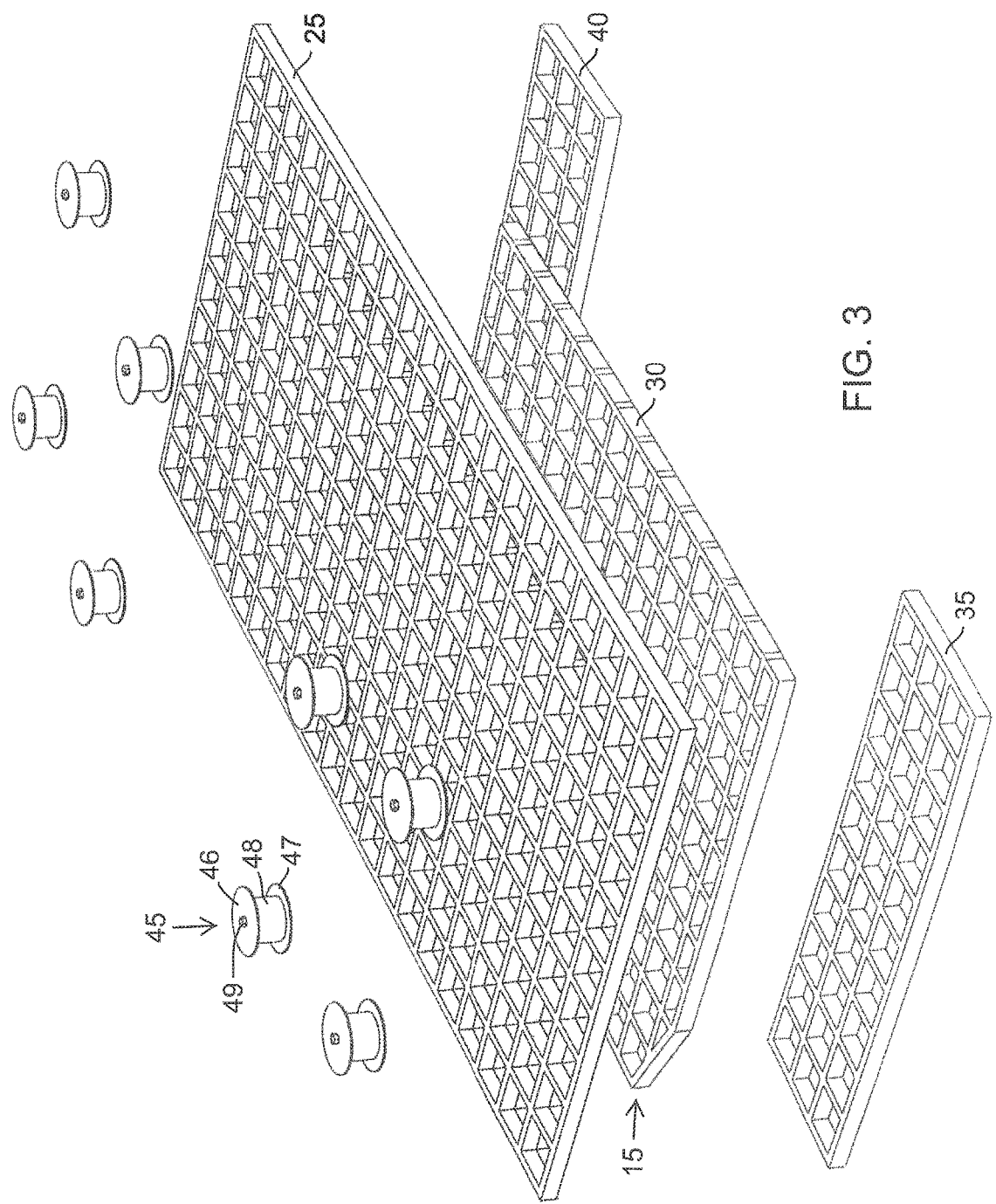
FIG. 3 is an exploded view of the fiberglass reinforced plastic grating of FIG. 1.

Referring now to FIGS. 1-3, protective mat 10 is made of a fiberglass reinforced polyester or epoxy material in the form of a grid or grating. As noted herein, the mat is preferably generally rectangular and has a forward portion 15 which is configured for interlocking in a recess 20 of a similarly configured adjacently positioned mat. A typical overall size for the mat is about 3 feet by 6 feet while the forward portion extends out about 8 inches and is about 3 feet wide with tapered sides, while the recess is also about 8 inches deep.

The mat itself may be made from a number of different grating sections. The upper section 25 is made of a rectangular grating which is configured to have the desired width that can span the buried conduit that it is designed to protect. The forward portion 15 is part of a second, lower grating 30 which is not as wide as upper section 25. To form recess 20, two additional rectangular portions 35, 40 having the same length as upper section 25 are provided at each end of the width of upper section 25. Thus, by placing lower grating 30 such that the forward portion 15 extends beyond the forward end of upper section 25, and by bounding either side of lower section 30 with end sections 35, 40, recess 20 is formed. Lower section is about 4 feet wide and 3 feet long, while end sections 35, 40 have typical sizes of about 3 feet by 1 foot. All grating sections are about 1 inch thick. The tapered sides of the forward portion 15 facilitates its insertion in to recess 20. Alternatively, if non-tapered sides are used, the recess can be slightly wider than the forward portion 15 for receipt thereof.

The various grating sections are joined by connectors 45 as best shown in FIG. 3. The connectors 45 include washers 46, 47, cylindrical spacers 48, bolts 49 and nuts (not shown). Of course, other connectors can be used depending upon the specific tolerances of the final mat. This would include rope, wire, nails, rivets, hooks or even adhesives, as desired.

These grating sections are provided with square or rectangle openings that are preferably between 2 and 5 inches wide, e.g., 2×2, 2×3, 3×3, 3×4, 4×4, 4×5, 5×5, 2×5, 3×5, etc. These openings allow the grating to have light weight compared to a solid structure. Of course, round, oval, polygonal or other shaped openings can be provided if desired. These openings also provide advantages with respect to the installation of the protective system of the invention.

Figure 4:
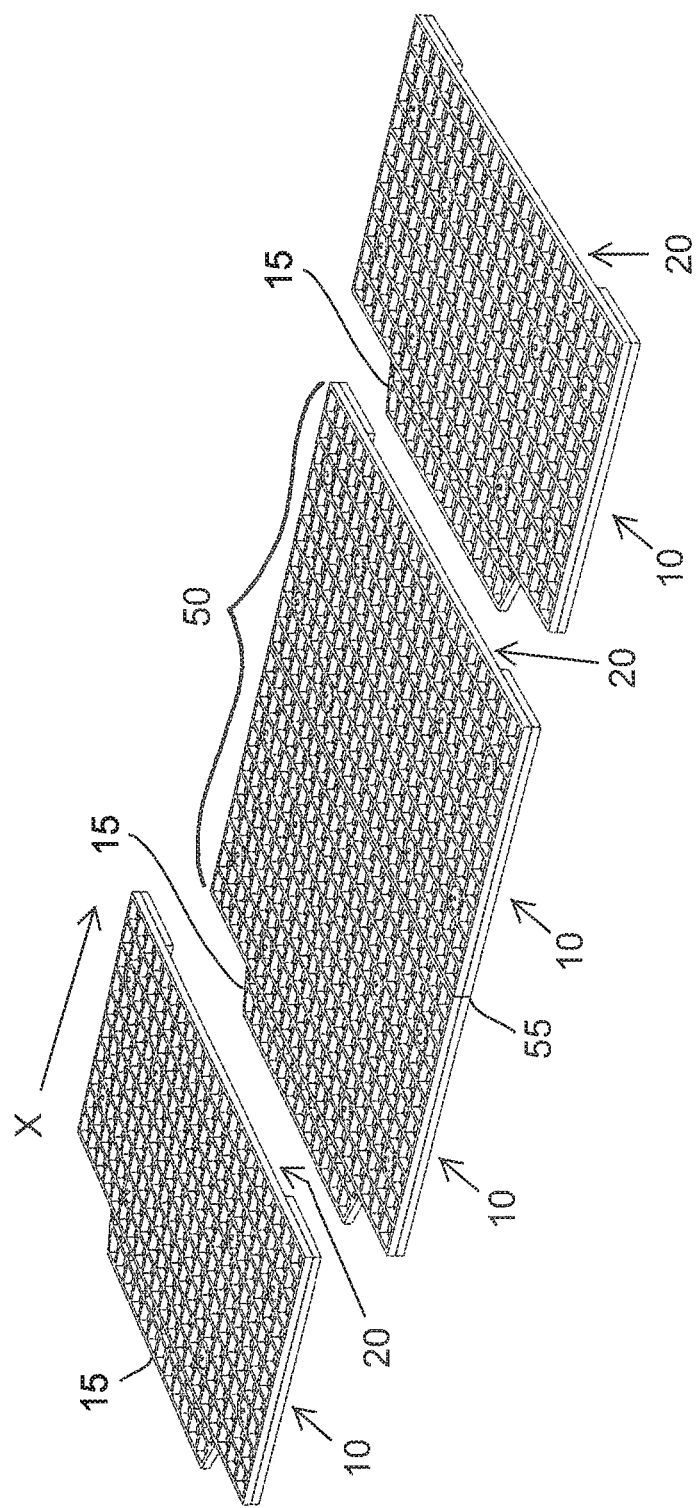
FIG. 4 is a view of how multiple fiberglass reinforced gratings according to FIG. 1 can be interconnected.
Figure 5:
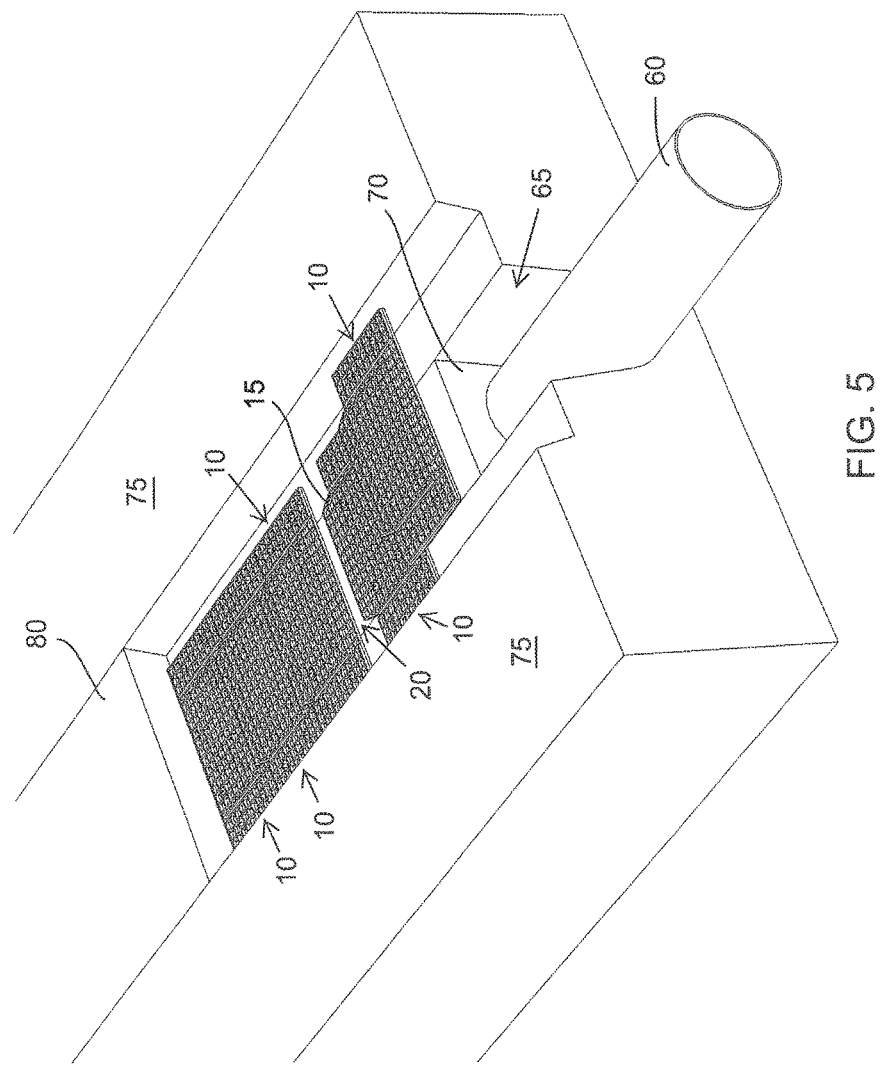
FIG. 5 is a view of the installation of multiple fiberglass reinforced plastic gratings of FIG. 1 above a buried conduit.

FIGS. 4 and 5 illustrate how the fiberglass reinforced plastic mat sections are interconnected and installed above a buried conduit. The forward portion 25 of one mat is inserted into the recess 20 of an adjacent mat to form a generally uniform horizontal arrangement as shown at 50 in FIG. 4 with the mats interlocking at joint 55. When the mats are joined together, the interlock does not need to be perfect but it does need to be sufficient so that the interlocking surface does not rest on the corner of the lower section of the mat. Also, the mats would be assembled in direction X, with the mat shown on the right side of the drawing installed first followed by the mat that is placed adjacent to it. Then, subsequent mats would follow in the same manner, with recess 20 of the next mat placed over forward portion 25 of the previously laid mat.

FIG. 5 illustrates the placement of the mats 10 above a buried conduit 60 in the form of a gas pipeline. Initially, a trench 65 is formed into which conduit 60 is placed. The trench 65 is then backfilled with appropriate material 70 to form a relatively flat surface that is at least a few feet and typically about 2 to 3 feet below ground level 75. The mats 10 are then installed by interconnecting and interlocking them as shown in FIG. 4. After that, the area above the mats in the trench is provided with additional backfill 80 to fill the trench back up to ground level 75. With this protective system, once a backhoe or other type of digging equipment begins to remove earth for a further installation of some sort, such as a building footing, the protective mat system would be encountered well before the backhoe would be able to contact or damage conduit 60.

Figure 6:
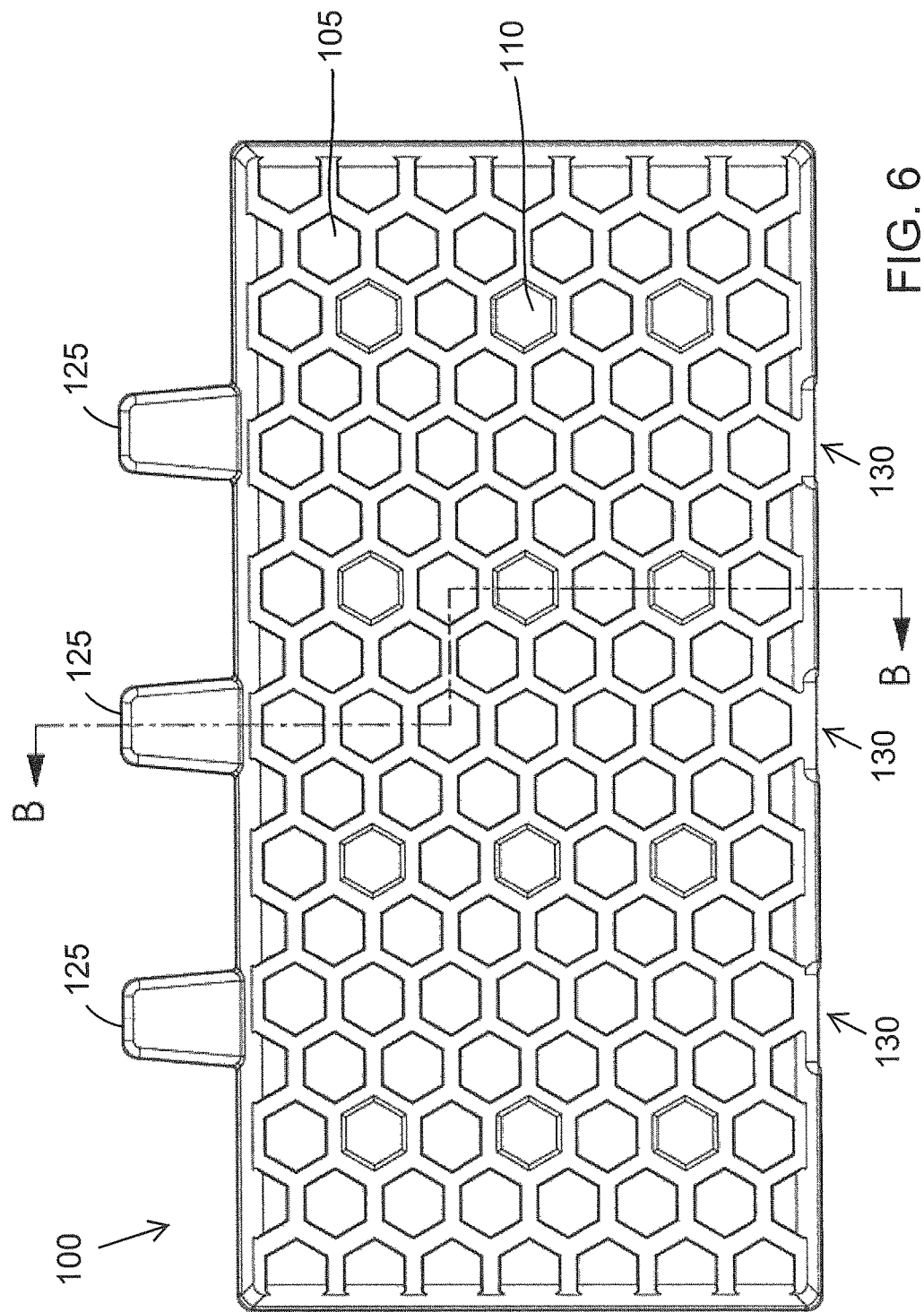
FIG. 6 is a top view of a molded plastic mat according to a further embodiment of the invention.
Figure 7:
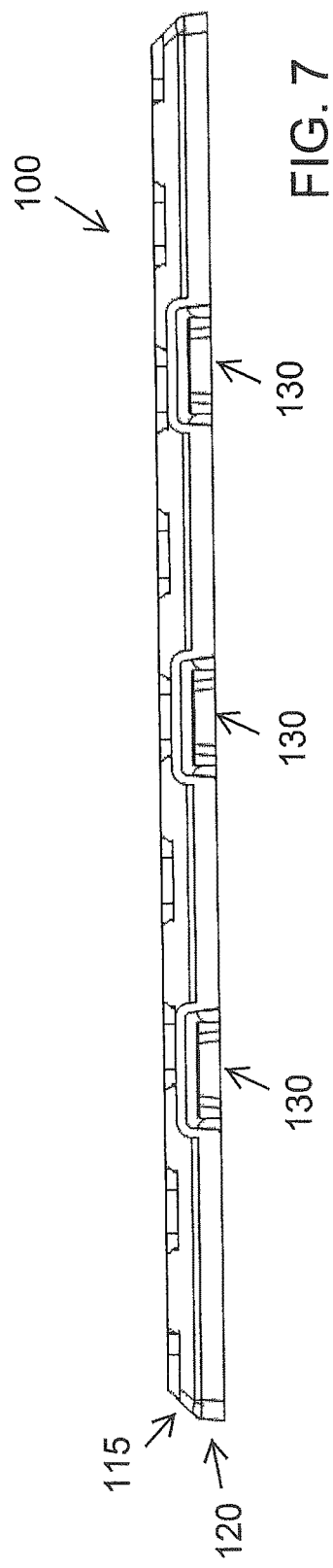
FIG. 7 is a rear view of the mat of FIG. 6.
Figure 8:
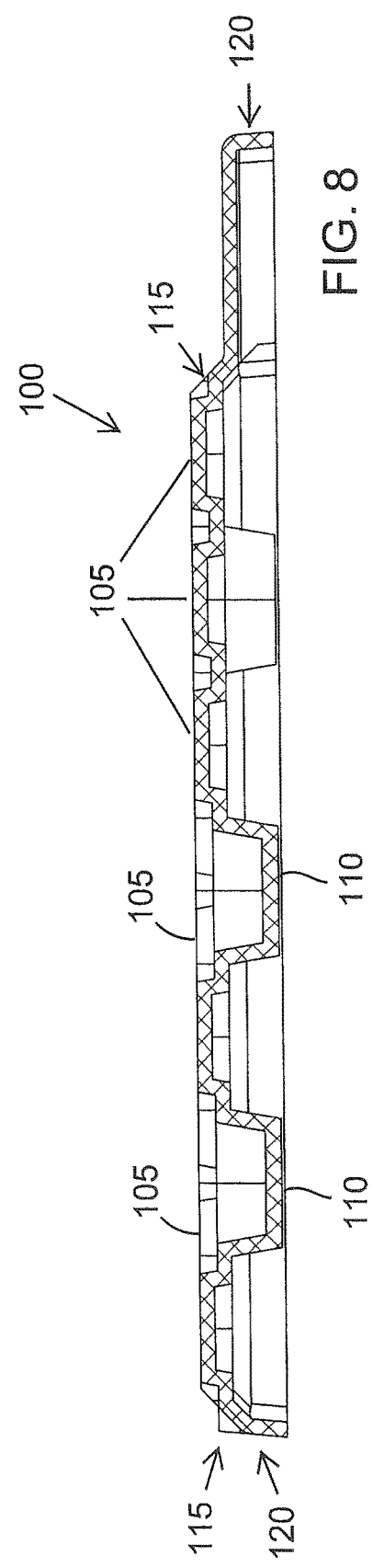
FIG. 8 is a cross-sectional view taken along lines B-B of FIG. 6.

FIGS. 6 to 8 illustrate another embodiment of a suitable protective mat for use in protecting underground buried conduit. This particular mat 100 is molded of a thermoplastic material and has a plurality of cells 105 therein. The thermoplastic material is preferably high density polyethylene although other moldable materials can be used if desired. Useful materials include:

Acrylonitrile butadiene styrene (ABS)
Acrylic (PMA)
Celluloid
Cellulose acetate
Cyclo olefin Copolymer (COC)
Ethylene-Vinyl Acetate (EVA)
Ethylene vinyl alcohol (EVOH)
Fluoroplastics (PTFE, alongside with FEP, PFA, CTFE, ECTFE, ETFE)
Ionomers
Kydex, a trademarked acrylic/PVC alloy
Liquid Crystal Polymer (LCP)
Polyacetal (POM or Acetal)
Polyacrylates (Acrylic)
Polyacrylonitrile (PAN or Acrylonitrile)
Polyamide (PA or Nylon)
Polyamide-imide (PAI)
Polyaryletherketone (PAEK or Ketone)
Polybutadiene (PBD)
Polybutylene (PB)
Polybutylene terephthalate (PBT)
Polycaprolactone (PCI)
Polychlorotrifluoroethylene (PCTFE)
Polyethylene terephthalate (PET)
Polycyclohexylene dimethylene terephthalate (PC(PC)T)
Polycarbonate
Polyhydroxyalkanoates (PHAs)
Polyketone (PK)
Polyethylene (PE)
Polyetheretherketone (PEEK)
Polyetherketoneketone (PEKK)
Polyetherimide (PEI)
Polyethersulfone (PES)—see Polysulfone
Polyethylenechlorinates (PEC)
Polyimide (PI)
Polylactic acid (PLA)
Polymethylpentene (PMP)
Polyphenylene oxide (PPO)
Polyphenylene sulfide (PPS)
Polyphthalamide (PPA)
Polypropylene (PP)
Polystyrene (PS)
Polysulfone (PSU)
Polytrimethylene terephthalate (PTT)
Polyurethane (PU)
Polysulfone (PSU)
Polytrimethylene terephthalate (PTT)
Polyvinyl chloride (PVC)
Polyvinylidene chloride (PVDC)
Styrene-acrylonitrile (SAN)

The mat may also be made of an elastomeric material. The elastomers are usually thermosets (requiring vulcanization) but may also be thermoplastic. Typical elastomers include:

Unsaturated rubbers that can be cured by sulfur vulcanization—these are preferred from a strength and hardness standpoint:
Natural polyisoprene: cis-1,4-polyisoprene natural rubber and trans-1,4 polyisoprene gutta-percha;
Synthetic polyisoprene;
Polybutadiene;
Chloropene rubber, i.e., polychloroprene;
Butyl rubber (i.e., copolymer of isobutylene and isoprene) including halogenated butyl rubbers (chloro butyl rubber; bromo butyl rubber);
Styrene-butadiene Rubber (copolymer of styrene and butadiene); and
Nitrile rubber (copolymer of butadiene and acrylonitrile).
Saturated (i.e., non-vulcanizable) rubbers include:
Ethylene propylene rubber (EPM);
Ethylene propylene diene rubber (EPDM);
Epichlorohydrin rubber;
Polyacrylic rubber;
Silicone rubber;
Fluorosilicone Rubber;
Fluoroelastomers;
Perfluoroelastomers;
Polyether block amides; and
Chlorosulfonated polyethylene.

The elastomeric, thermoplastic or thermosetting materials disclosed herein can also be provided with conventional fillers to increase weight and hardness. They also can be reinforced with particulates, fibers such as glass, fabric or metal screening or scrim to reduce elongation and provide greater rigidity. Typically, the filler is of low weight to maintain the weight of the mat at an acceptably manageable level.

The upper section is formed of certain cells that have a closed upper face 105 and open lower face while the lower section is formed of cells 110 that have an open upper face on the top surface of the mat and a closed face on the lower surface of the mat. Thus, the upper section 115 of the mat can be considered that portion of the mat that extends above a longitudinal center plane passing through the mat and includes the closed faces cells 105 while the lower section 120 of the mat includes that portion of the mat extending below the longitudinal center plane that include the lower faces of cells 110.

Figure 9:
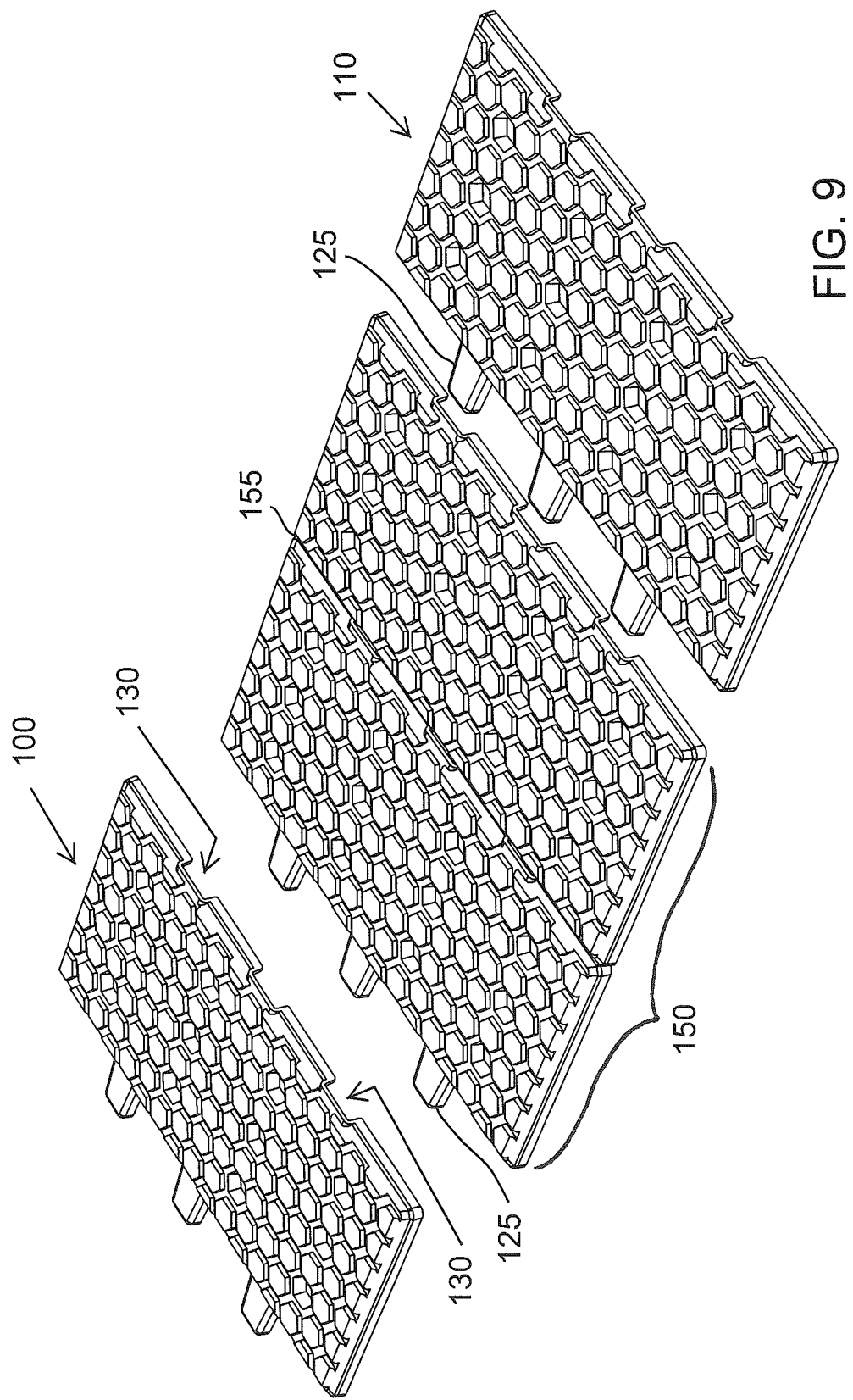
FIG. 9 is a view of how multiple plastic mats according to FIG. 6 can be interconnected.

For interlocking, as shown in FIG. 9, the mat includes 1 to 4 and preferably at least 2 or 3 protrusions 125 that are molded onto the mat and actually form part of the lower section 120. Recesses 130 are formed on the opposite side of the mat from the protrusions, and are configured in the same shape to receive the protrusions 125 of a similarly configured adjacent mat for interlocking therewith. As with the mats of the other embodiments, the interlocking mats form a relatively horizontal surface 150 with the mats aligned at joint 155. Also, it is possible and actually preferred to have some of the cells open both on top and bottom surfaces of the mat as well as extending therethrough to allow liquid, moisture, or gas to pass through the mat. Approximately 10 to 15% of the cells should be completely open. A typical overall size for the mat is again about 3 feet by 6 feet, with the protrusions sticking out by about 7 or 8 inches and being about 4 to 5 inches wide and again having tapered sides to facilitate receipt of the protrusions 125 by the recesses 130. The total mat thickness is about 2.5 to 3 inches with the lower section being about half that. In particular, the total thickness of the mat from the highest to lowest point is 2.85 inches with the lower section and protrusions being about 1.7 inches. The thickness of the molding will be between about ¼ and ¾ inch with about 0.5 inch preferred. And during installation of these mats, the subsequent mats are installed with the recesses 130 placed over the protrusions 125.

Figure 10:
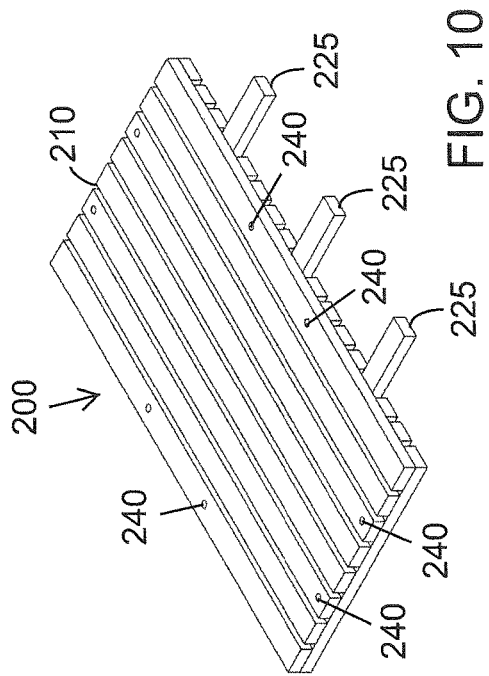
FIG. 10 is a perspective view of a two layer wood mat in accordance with the further embodiment of the invention.
Figure 11:
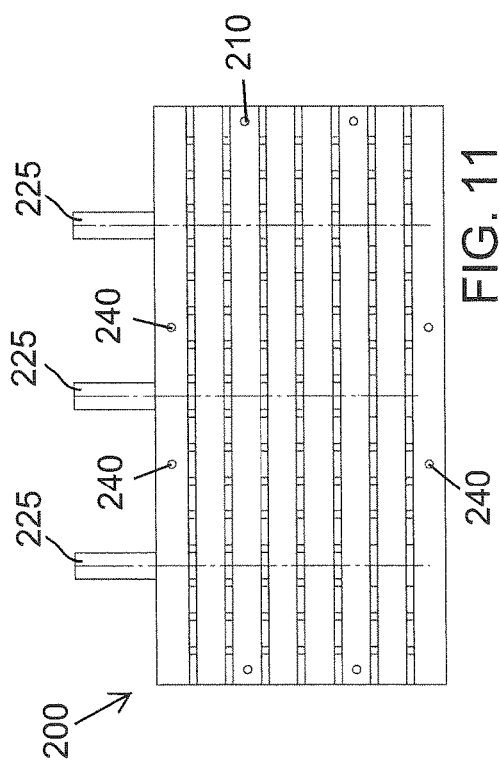
FIG. 11 is a top view of the mat of FIG. 10.
Figure 12:
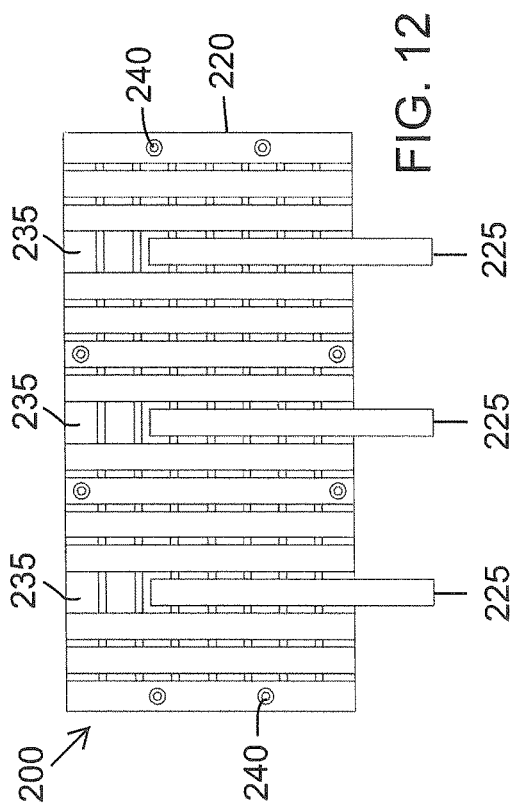
FIG. 12 is a bottom view of the mat of FIG. 11.

FIGS. 10 to 12 illustrate another mat 200 that is suitable for use in the present invention. This particular mat 200 is made of upper 210 and lower 220 sections of elongated members which as noted herein may be of lightweight wood, plastic material, a foamed material, or a tubular material of wood, plastic or metal. These members may be coated with plastic to provide improved environmental resistance in particular when wood is used. Preferably, these members are made of relatively thin wood boards of oak or treated pine and are arranged such that those in the upper section form an angle of 90° with those in the lower section. Also, as in the previous embodiment, at least three of the elongated members 225 of the lower section 220 protrude from the forward end of the mat. The forward advancement of the positioning of those members also provides the corresponding recesses 235 on the opposite end of the mat 200. The elongated members are connected by conventional bolting and nuts but rivets, nails or screws can also be used to fasten the elongated members together. A skilled artisan can best determine where to provide fasteners to properly secure the elongated members to the mat. The mat 200 also includes a number of openings 240 which can be receive ropes or other items that can be used to help move and install the mats.

A typical overall size for mat 200 again is about 3 feet by 6 feet with an overall thickness of about 0.5 to 4 inches. Each section layer would be about 0.25 to 2 inches thick, while the elongated members in each layer would be about 2 to 5 inches wide and as long as necessary to cover the full length or width of the mat. The boards would have a thickness of between about ¼ and 1 inch, and preferably about ½ to 1 inch, with a preferred width dimension of about 3 to 4 inches. The thinner boards are needed to reduce the overall weight of the mat.

Figure 13:
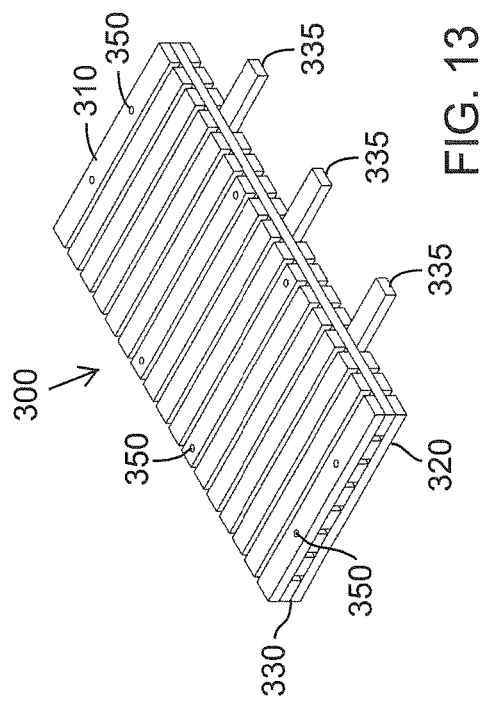
FIG. 13 is a perspective view of a three layer wood mat in accordance with yet another embodiment of the invention.
Figure 14:
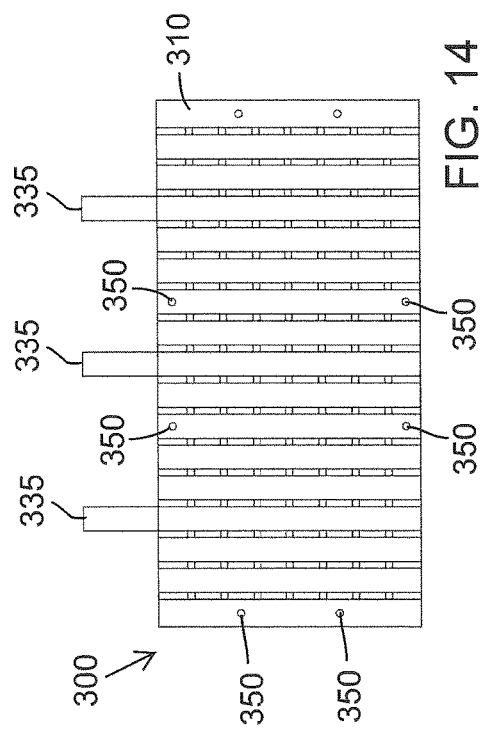
FIG. 14 is a top view of the mat of FIG. 13.
Figure 15:
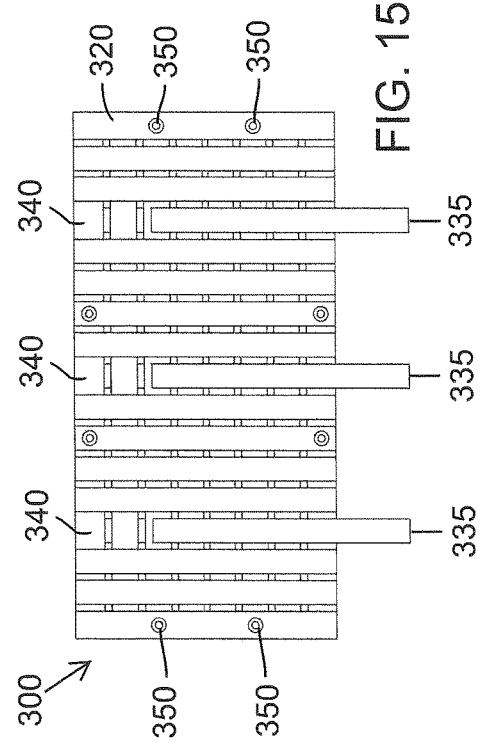
FIG. 15 is a bottom view of the mat of FIG. 13.

FIGS. 13 to 15 illustrate yet another mat 300 that is suitable for use in the present invention. This mat 300 is made of upper 310 and lower 320 sections of elongated members which may be of the same materials as the two layer mat 200 of FIGS. 10 to 12. Again, the elongated members are preferably made of wood as in mat 200. The mat 300 also includes an additional layer 330 between the upper 310 and lower 320 sections to thus form a three layer mat 300. In this mat, the upper 310 and lower 320 sections include elongated members that are aligned in the same direction, whereas the elongated members of the additional layer 330 are arranged in an angle of 90° to the elongated members of both the upper and lower sections.

Again, at least three elongated members 335 of the lower section 320 protrude from the forward end of the mat. The forward advancement of the positioning of those three members also provides the corresponding recesses 340 on the opposite end of the mat 300.

The elongated members are connected by conventional bolting and nuts, but rivets, nails or screws can also be used to fasten the elongated members together. A skilled artisan can best determine where to provide them to properly secure the elongated members to the mat.

The mat 300 is again about 3 feet by 6 feet in dimensions with an overall thickness of about 0.75 to 6 inches. Each section layer would be about 0.25 to 2 inches thick, while the elongated members in each layer would be about 2 to 5 inches wide and as long as necessary to cover the full length or width of the mat. The boards would have a thickness of between about ¼ and 1 inch, and preferably about ½ to 1 inch, with a preferred width dimension of about 3 to 4 inches. The thinner boards are needed to reduce the overall weight of the mat. Also, mat 300 includes a number of openings 350 which can receive ropes or other items that can be used to help move and install the mats.

The mats 200 and 300 include spacing between the elongated members which provides the equivalent of holes or openings passing through the mat, whereas in the thermoplastic mat 100, the openings are provided by leaving some of the cells without a top or bottom portion. These openings all function similarly to what is provided with the openings of the fiberglass reinforced plastic mat 10. All of these openings provide a path for liquid, moisture or gas to pass through the mat. As the mats are covered with soil after being installed, it is not essential that the mats have any continuous surface. In fact, it is preferred that the surface not be continuous to provide at least some openings through the mat. These openings can be added by drilling holes in the mat after formation or by molding or otherwise forming the holes in the mat during formation or manufacture.

Figure 16:
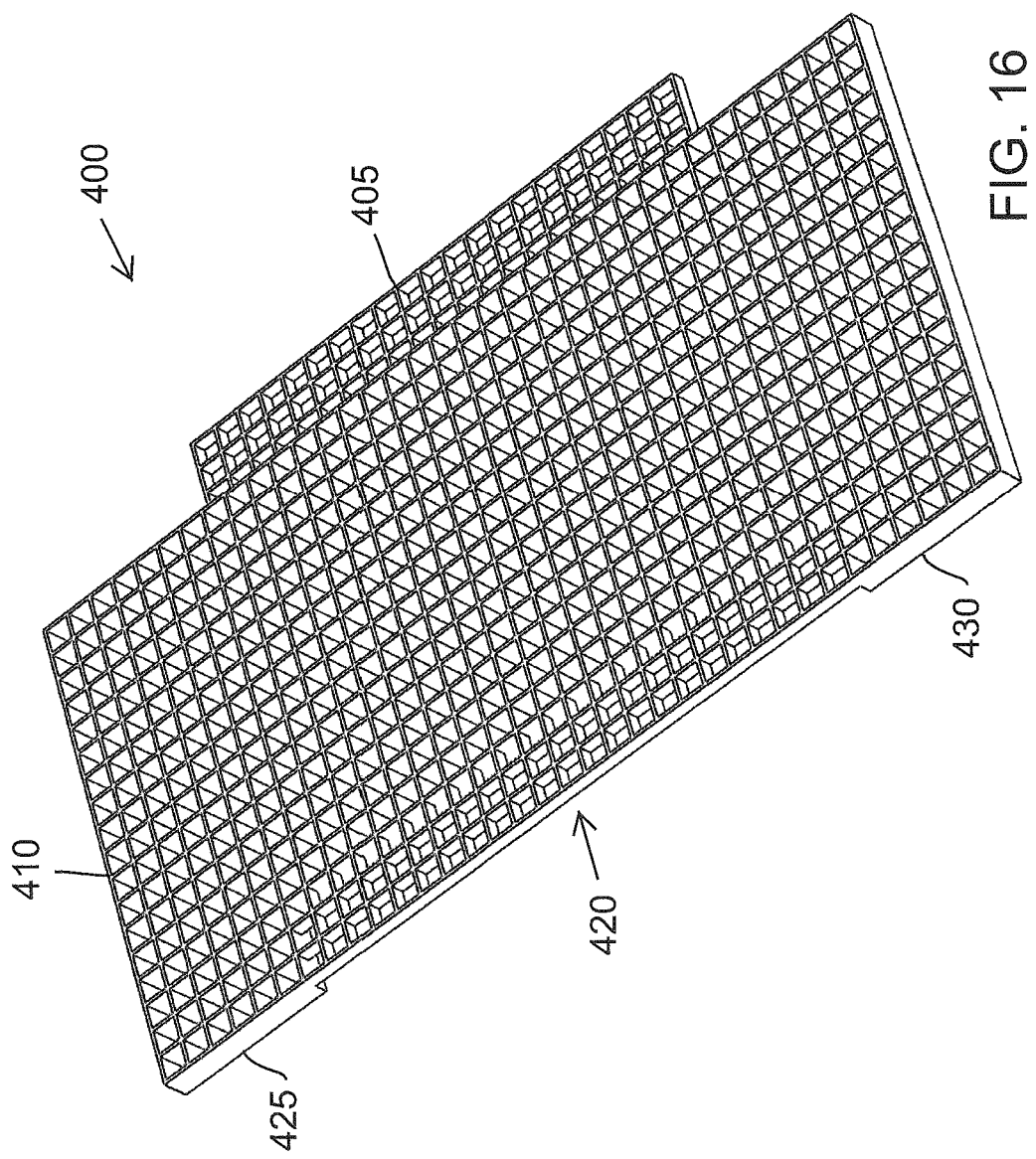
FIG. 16 is a perspective top view of a mat made of a one-piece fiberglass reinforced plastic grating in accordance with yet another embodiment of the invention.
Figure 17:
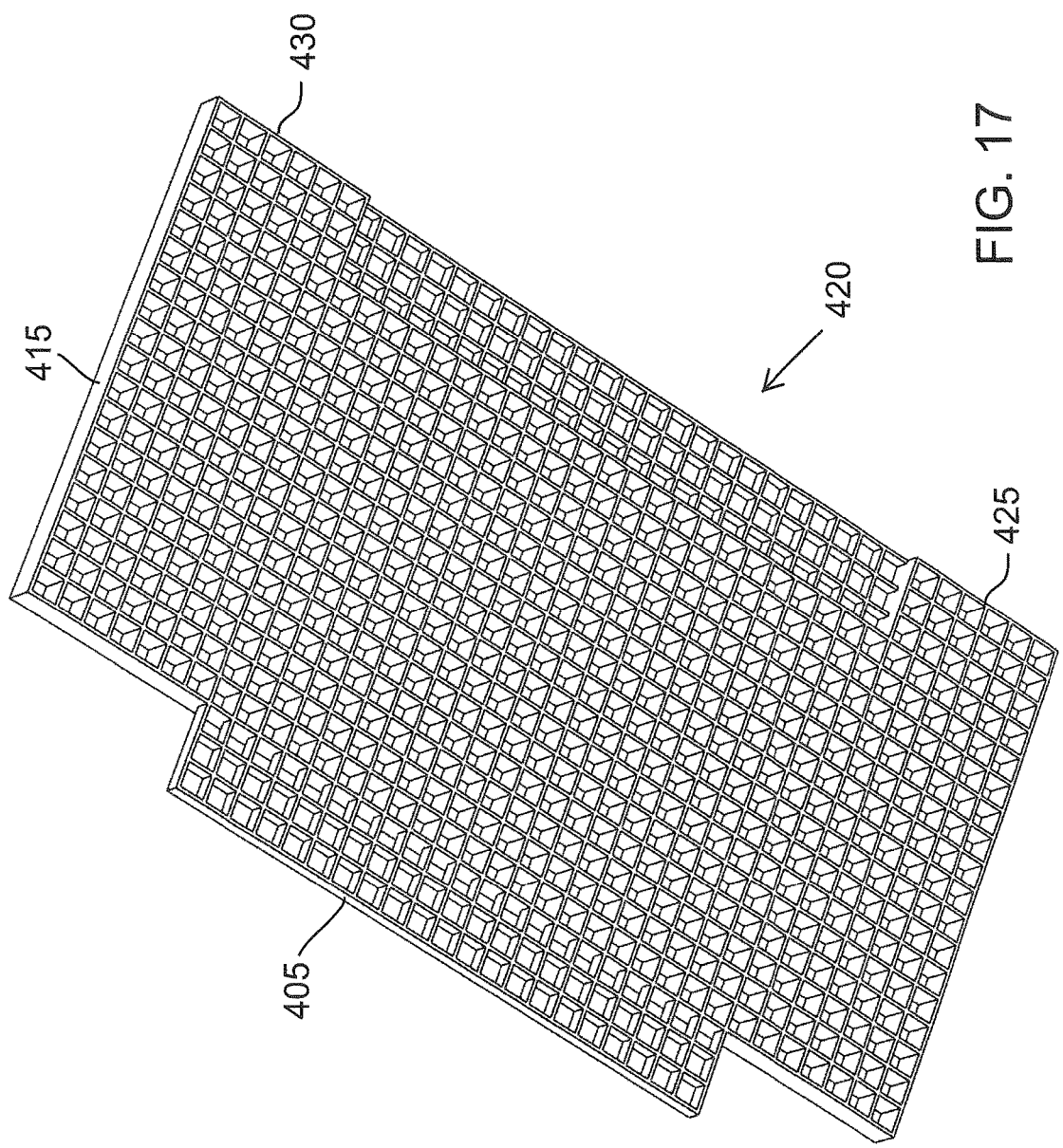
FIG. 17 is a bottom perspective view of the mat of FIG. 16.

FIGS. 16 to 17 are illustrations of a one piece fiberglass reinforced plastic grating for use as a protective mat 400 according to the invention. The plastic materials for use in the grating are typically polyester or epoxy resins that are reinforced with glass fiber or similar fillers. The mat can either be cut out from a larger rectangular mat or can be molded to the specific shape shown. As in other embodiments, the mat would include a forward portion 405 which is approximately 4 feet wide and about 6 to 8 inches long. In addition, the upper section 410 of the mat would be a 1 inch thick 3'×6' rectangular shaped portion of the structure. The lower section 415 would be a 1 inch thick portion of the mat having an opening or recess 420 that would receive the forward portion of an adjacent mat for interlocking therewith. In addition to the forward portion 405, lower section 415 would include a rectangular portion that is slightly smaller than upper section 410 and two and portions 425, 430 that extend from the sides of the upper section 410, defining the sides of the recess 420. The grating can have openings that are of the same size as the grating openings for the mat of FIGS. 1-3.

Figure 18:
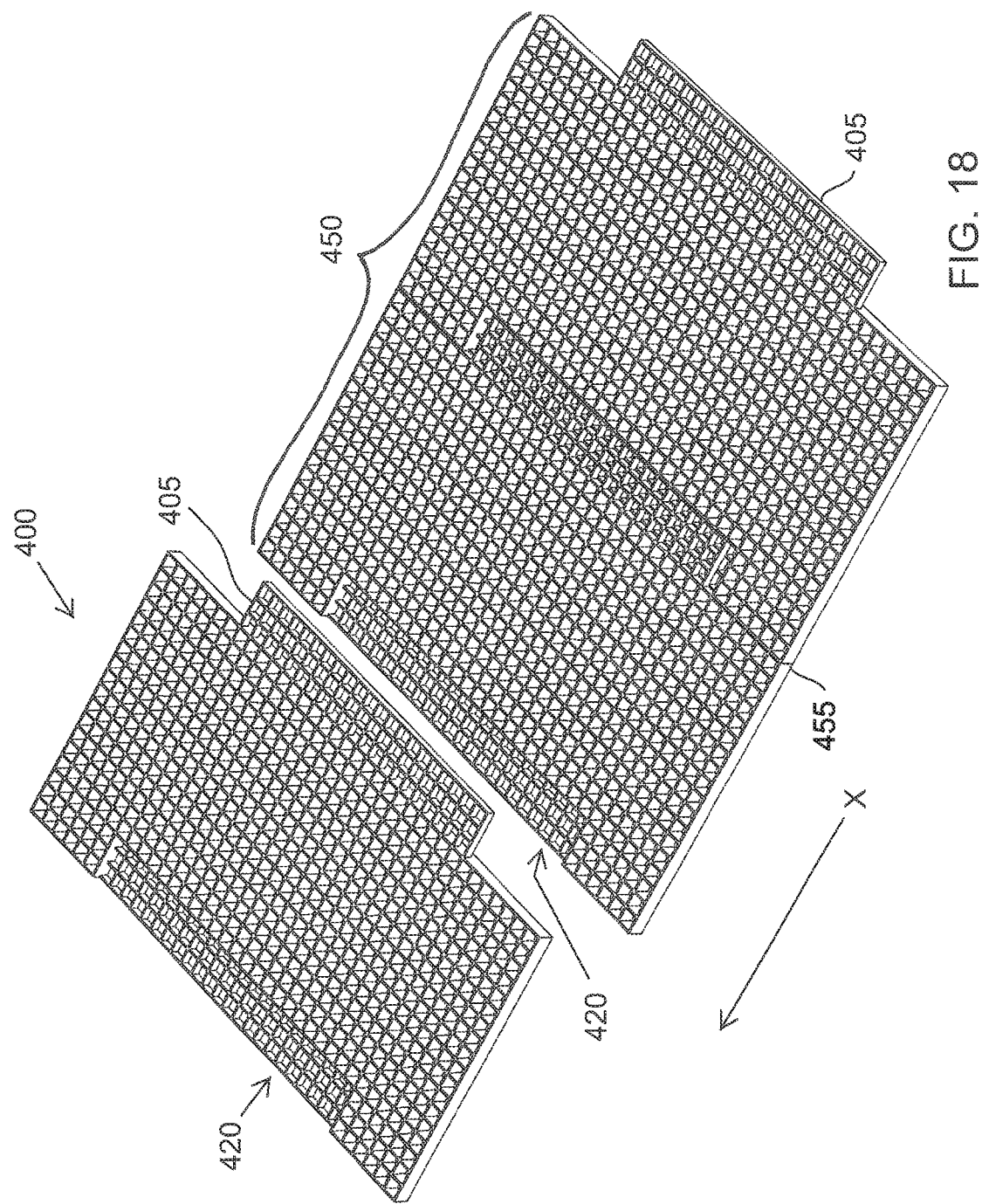
FIG. 18 is a view of how multiple mats according to FIG. 16 can be interconnected.

FIG. 18 illustrates how the mats 400 are interconnected and installed above a buried conduit. The first mat is installed with the recess 420 facing up, so that the next mat can be placed with the forward portion 405 inserted into the exposed recess 420 at joint 455. The mats have a generally uniform horizontal arrangement as shown at 450. Additional mats can be added and interlocked to follow the path of the buried conduit and provide the protective system above it. To the extent that the buried conduit makes a turn or bend, the mats can be arranged to follow the curvature of the conduit by simply placing one man above another and using a few stakes or spikes to pass through the open holes in the grating to fix the subsequent a mat in the right position with respect to the previously laid mat. While this does not result in a completely horizontal insulation installation, the raised additional mat can be supported with additional earth or backfill beneath it and the subsequent mats can be interlocked in the same manner as previously described herein. Additional turns or changes of direction of the conduit can be followed in the same manner. These conduits typically include long lengths of straight or linear runs so that the majority of the mats can be interlocked as described herein.

Figure 19:
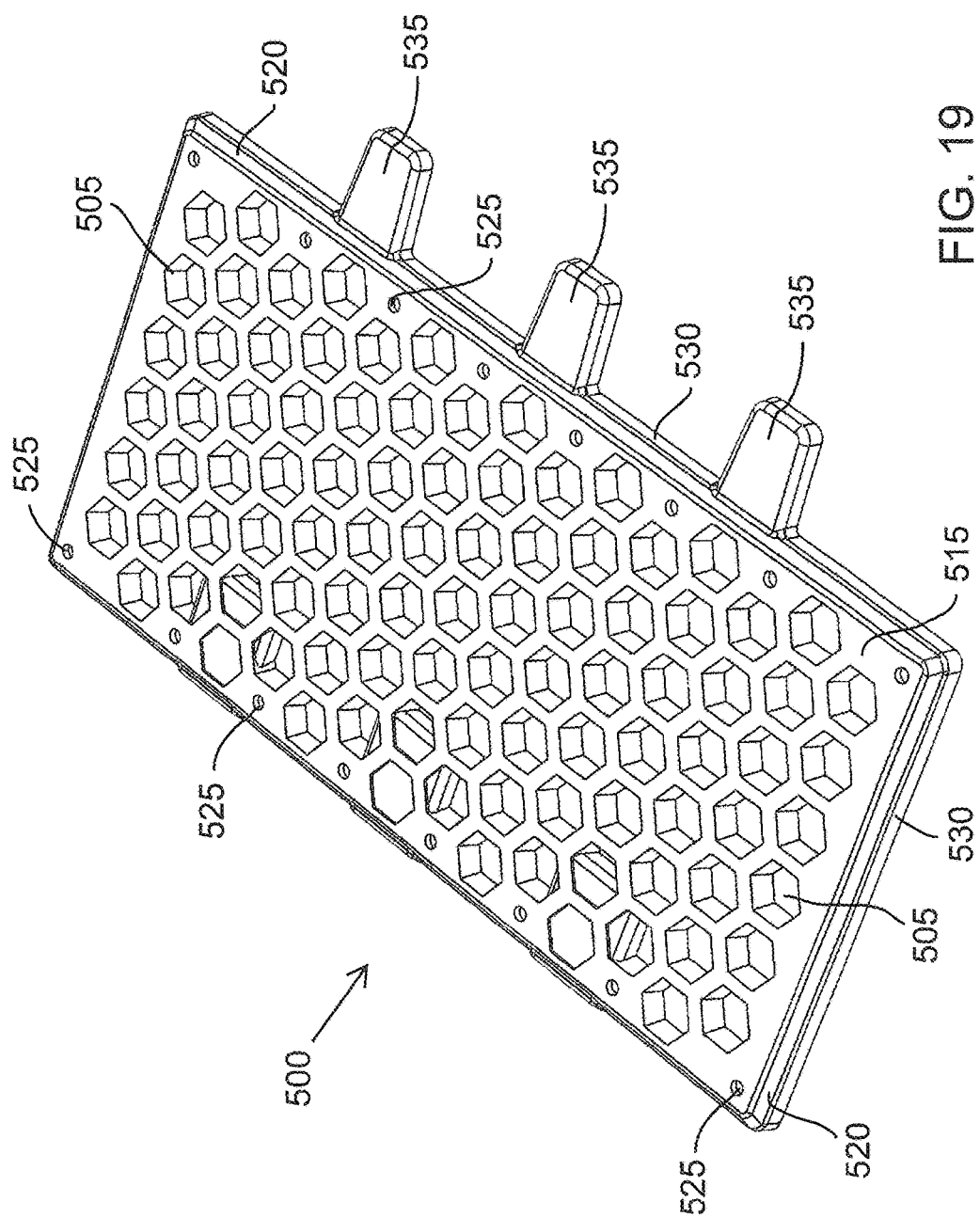
FIG. 19 is a perspective top view of a mat made of a one-piece fiberglass reinforced plastic grating in accordance with yet another embodiment of the invention.
Figure 20:
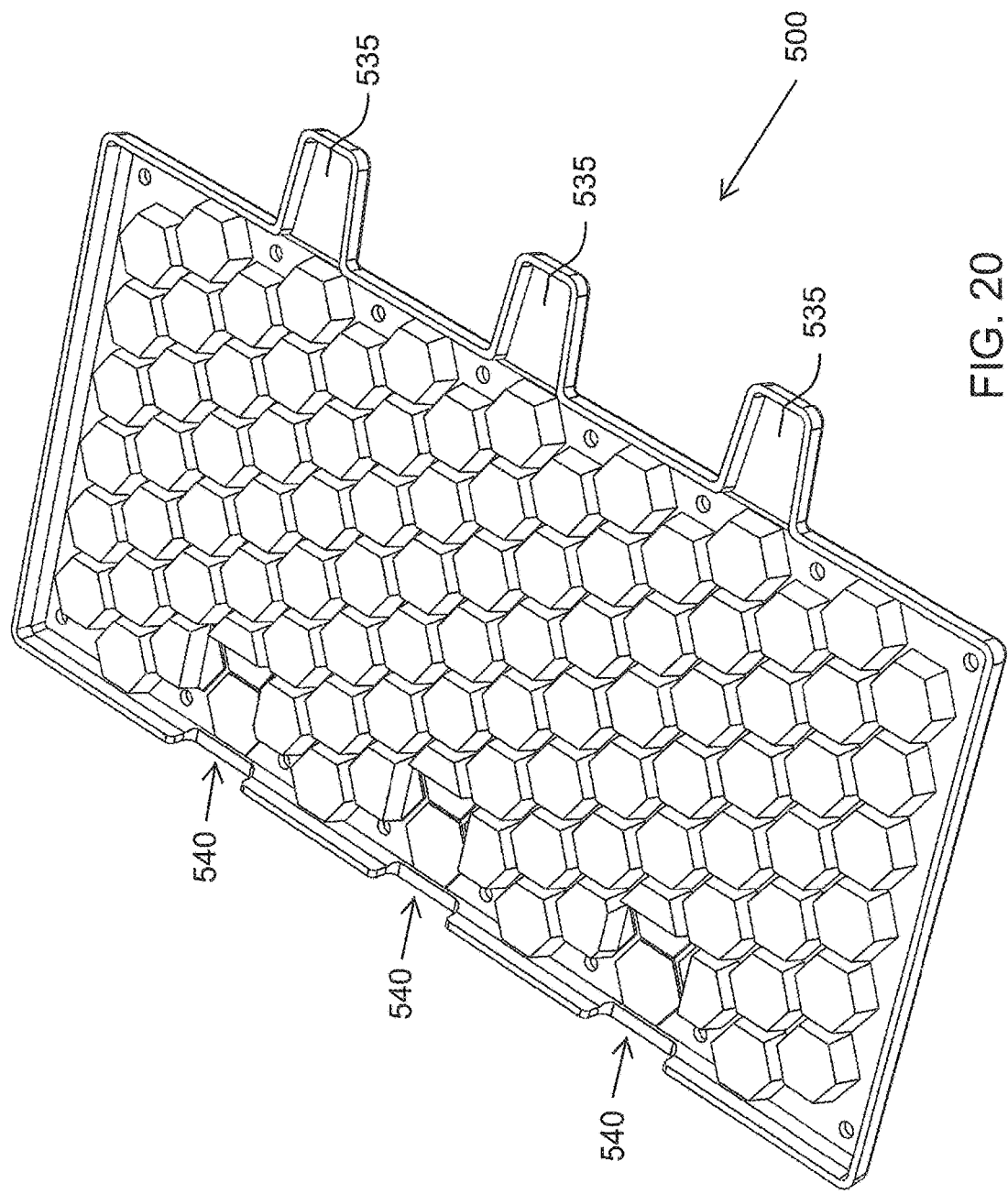
FIG. 20 is a bottom perspective view of the mat of FIG. 19.

FIGS. 19 to 20 are illustrations of a one piece molded plastic mat for use as a protective mat 500 according to the invention. This particular mat 500 is molded of a thermoplastic material and has a plurality of cells 505 therein. The thermoplastic material is preferably high density polyethylene although other moldable materials disclosed herein can be used instead if desired.

The upper section 515 is formed of a plurality of cells that are all open facing upwards. The upper section 515 of the mat also includes a peripheral tapered edge 520 that helps strengthen the upper section 515. The upper section 515 also includes a plurality of holes or apertures 525 extending through the thickness of the mat and places in strategic locations to allow water to drain through the mat.

The lower section 530 of the mat is in particular a skirt that extends below the tapered edge 520 to below the bottom of the cells 505. Recesses 540 are formed in the lower section by removing or not molding some of the cells 505 so that the protrusions 535 of a similarly configured adjacent mat can be received therein. The protrusions can have tapered sides to facilitate insertion in the recesses or the sides can be uniform and the recesses simply provided with wider openings than the protrusions.

For interlocking, the mat includes 2 to 4 and preferably 3 protrusions 535 that are molded onto the mat and actually form part of the lower section 530. The protrusions 535 also include a tapered edge and widened lower portion in a manner similar to that of the upper and lower sections. This arrangement allows stacking of multiple mats one upon another for compact shipping and transport.

Figure 21:
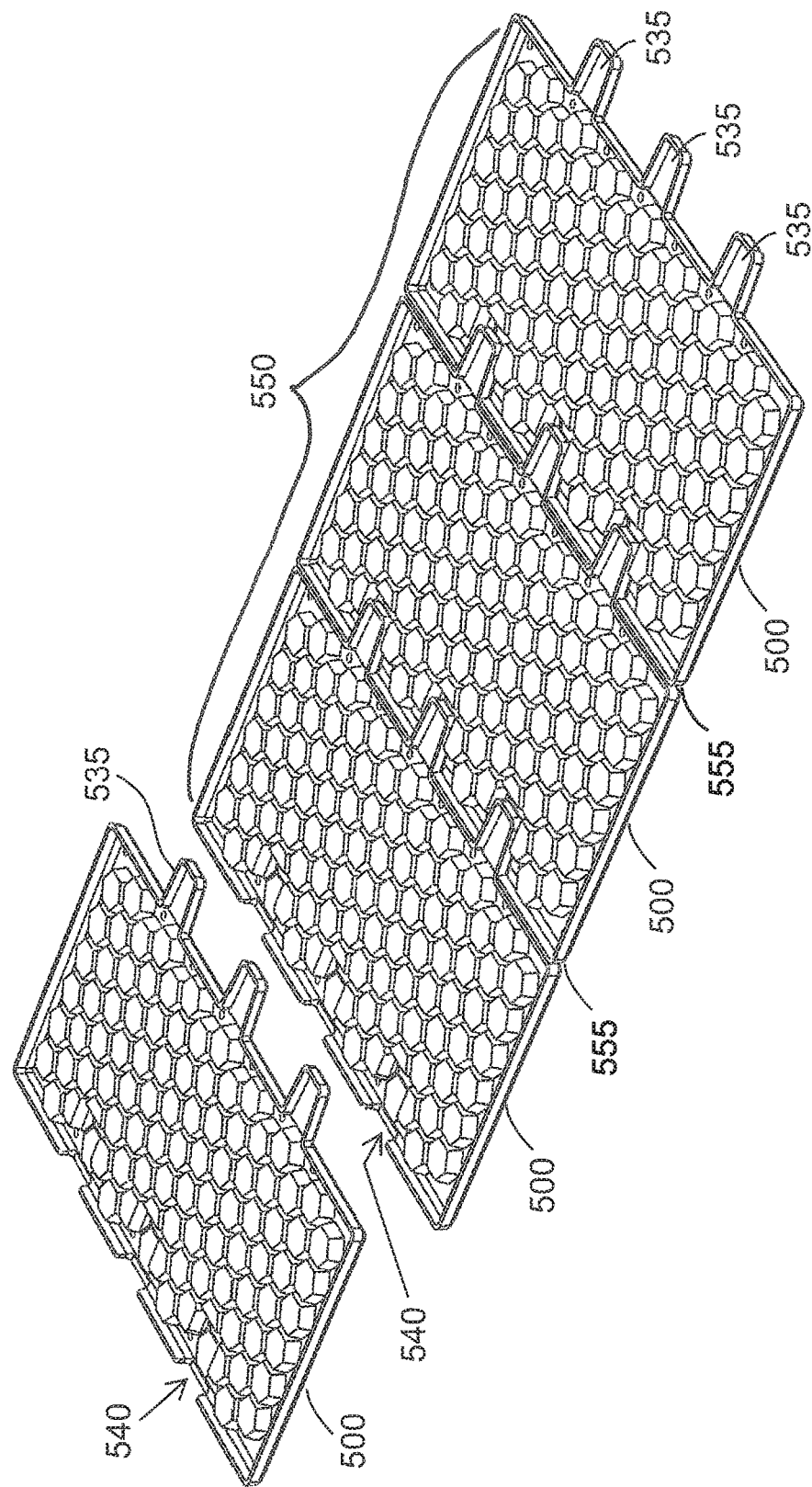
FIG. 21 is a view of how multiple mats according to FIG. 19 can be interconnected.

FIG. 21 illustrates how the mats 500 are interconnected and installed above a buried conduit. The first mat is installed with the recesses 540 facing up, so that the next mat can be placed with the protrusions 535 inserted into the exposed recesses 540 at joint 555. The mats have a generally uniform horizontal arrangement as shown at 550. Additional mats can be added and interlocked to follow the path of the buried conduit and provide a protective system above it.

As noted, at least the upper section is preferably made of a bright color, such as yellow or orange to enhance visibility of the mats when the area above them is to be excavated. These colors also indicate the danger that continued excavation is not suggested.

Therefore, in sum, it is to be realized that the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

It is to be understood that when describing the mats themselves the nomenclature of upper and lower sections is included to denote how one would look at a particular mat structure, but these mats can be installed right side up, i.e., with the upper section facing up, or with the upper section facing down. Furthermore, a skilled artisan can reconfigure the placement of the forward portions and recesses to facilitate installation.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. Accordingly, all suitable modifications and equivalents may be resorted to falling within the scope of the invention.

What is claimed is:

1. A method for protecting a buried conduit, which comprises:
    positioning and interlocking a plurality of mats in a position spaced above a conduit that is provided in a trench that is backfilled to form a generally horizontal surface, with the mats provided on the generally horizontal surface; and
    placing additional backfill in the trench upon and above the interlocked mats to fill the trench to ground level;
    wherein the mats comprise upper and lower sections, wherein the upper section includes a single integral layer that includes an open grid or grating having a network of members that cross each other to form a series of squares or rectangles, and wherein the lower section includes a single integral layer that includes an open grid or grating having a network of members that cross each other to form a series of squares or rectangles, with the lower section including additional components, one of which forms a protruding element and two others of which form a recess for receiving the protruding element of an adjacent mat;
    a forward end that includes the protruding element; and
    a rearward end that includes the recess that is configured and dimension for receiving the protruding element of a similarly configured adjacent mat;
    wherein the protruding element and recess are associated with and located on the lower section of the mat and extend forward from the lower section of the mat and in the same plane for forward sliding engagement into the recess; and
    wherein the protruding element of one mat are configured to facilitate insertion into the recess of an adjacent mat for easily interlocking the mats together.

2. The method of claim 1, wherein the mats have openings therein to allow liquid, moisture, or gas to pass therethrough.

3. The method of claim 1 wherein at least some of the mats are configured to provide a change in direction when interlocked with a previously installed adjacent mat.

4. The method of claim 1 wherein the upper section of the mats includes writing or indicia thereon that indicates that type of conduit that is buried beneath the interlocked mats.

5. The method of claim 1 wherein the grid or grating of the upper section is made of fiberglass reinforced plastic.

6. The method of claim 5 wherein the grid or grating of the lower section is made of fiberglass reinforced plastic.

7. The method of claim 1 wherein at least some of the mats are configured to provide a change in direction when interlocked with a previously installed adjacent mat.

8. The method of claim 7 wherein one or more of the mats have a triangular, trapezoidal or square shape with protruding element and recess that are not aligned so that the interlocked mats can be provided with one or more changes of direction or a non-linear arrangement.

9. The method of claim 1 wherein the mats have sizes of between 2'×2' and 8' by 14' and a weight that is less than 200 pounds.

10. The method of claim 1 wherein the mats have sizes of between 3'×3' and 3'×7' and a weight of between 60 and 100 pounds.

11. The method of claim 1 wherein at least the upper section of each mat is made of a bright color.

12. The method of claim 1 wherein the upper section of the mats includes writing or indicia thereon that indicates that type of conduit that is buried beneath the interlocked mats.

13. The method of claim 1 wherein the protruding element includes beveled edges to facilitate insertion into the corresponding recesses.

14. The method of claim 13 wherein the recess is configured and dimensioned to be larger than the corresponding protrusion it is to receive and is tapered in a similar manner to facilitate insertion of the protruding element into the recess.

15. The method of claim 1 wherein the protruding element has a forwardmost end that is less wide then a rearward end of the protruding element while the corresponding recess for the protruding element is larger than the protruding element and may be tapered in a similar manner to the protruding element.

16. A method for protecting a buried conduit, which comprises:

positioning and interlocking a plurality of mats in a position spaced above a conduit that is provided in a trench that is backfilled to form a generally horizontal surface, with the mats provided on the generally horizontal surface; and placing additional backfill in the trench upon and above the interlocked mats to fill the trench to ground level;

wherein the mats are made of plastic materials and comprise a single integral layer for each of upper and lower sections, a forward end that includes a protruding element, and a rearward end that includes a recess that are configured and dimension for receiving the protruding element of a similarly configured adjacent mat;

wherein the protruding element and recess are associated with and located on the lower section of the mat and extend forward from the lower section of the mat and in the same plane for forward sliding engagement into the recess; and wherein the protruding element of one mat are configured to facilitate insertion into the recess of an adjacent mat for easily interlocking the mats together.

17. The method of claim 16 wherein the single integral layer of the upper section of each mat includes an open grid or grating having a network of members that cross each other to form a series of squares or rectangles, and wherein the single integral layer of the lower section includes an open grid or grating having a network of members that cross each other to form a series of squares or rectangles.

18. The method of claim 17, wherein the lower section includes additional components, one of which forms the protruding element and at least two others of which form the recess(es) for receiving the protruding element of an adjacent mat.

19. The method of claim 18 wherein the grid or grating of the upper or lower section, or of both sections, is made of fiberglass reinforced plastic.

\* \* \* \* \*